(12) United States Patent
Drouillard et al.

(10) Patent No.: US 6,650,734 B1
(45) Date of Patent: Nov. 18, 2003

(54) SYSTEM AND METHOD FOR AUTOMATIC COLLECT MESSAGING ON COLLECT CALL RESTRICTED TELEPHONE NUMBERS

(75) Inventors: Suzette Drouillard, Franklin Park, NJ (US); Carol P. Eversen, Long Valley, NJ (US); Amit Garg, Howell, NJ (US); Rajeev B. Patil, Holmdel, NJ (US); Courtney Aldington Pinnock, Howell, NJ (US)

(73) Assignee: AT&T Corporation, New York, NY (US)

( * ) Notice: Subject to any disclaimer, the term of this patent is extended or adjusted under 35 U.S.C. 154(b) by 0 days.

(21) Appl. No.: 10/197,900

(22) Filed: Jul. 17, 2002

(51) Int. Cl.[7] .............................. H04M 1/64; H04M 3/42
(52) U.S. Cl. ...................... 379/67.1; 379/68; 379/88.26; 379/88.12; 379/142.02; 379/201.02; 379/210.02; 379/210.03
(58) Field of Search ........................... 379/67.1, 68, 70, 379/88.17, 88.18, 88.26, 114.19, 114.2, 127.04, 144.01, 144.02, 218.01, 142.02, 201.02, 210.02, 210.03, 88.12

(56) References Cited

U.S. PATENT DOCUMENTS

| | | | | |
|---|---|---|---|---|
| 5,181,237 A | * | 1/1993 | Dowden et al. | 379/88 |
| 5,812,657 A | * | 9/1998 | Reding et al. | 379/242 |
| 5,859,902 A | * | 1/1999 | Freedman | 379/144 |
| 6,430,274 B1 | * | 8/2002 | Winstead et al. | 379/114.14 |
| 6,535,585 B1 | * | 3/2003 | Hanson et al. | 379/88.12 |
| 2002/0076005 A1 | * | 6/2002 | Bauer | 379/67.1 |

* cited by examiner

Primary Examiner—Allan Hoosain
(74) Attorney, Agent, or Firm—Brooks Kushman P.C.

(57) ABSTRACT

In a telephone network for use in placing telephone calls to a destination number associated with a called party, the destination number having restricted access for collect telephone calls, a system and method for providing a message to the called party of a collect telephone call from a calling party. A caller placing a collect telephone call is notified of the restricted access of the destination number for collect telephone calls and provided with an option for recording a message for delivery to the called party. If the calling party accepts the option, a message is recorded, such as by routing the collect telephone call to a messaging platform for use in recording the message.

17 Claims, 2 Drawing Sheets

SYSTEM AND METHOD FOR AUTOMATIC COLLECT MESSAGING ON COLLECT CALL RESTRICTED TELEPHONE NUMBERS

BACKGROUND OF THE INVENTION

1. Field of the Invention

The present invention relates to a system and method for use in a telephone network, the system and method for providing automatic collect messaging for a calling party placing a collect call to a called party where a destination number associated with the called party has restricted access for collect telephone calls.

2. Background

Various telephone service providers offer customers what may be referred to as a collect messaging service. Such a service may be provided for a calling party placing a collect telephone call to a destination number associated with a called party, where the called party is not available to receive the collect call at the time it is placed by the calling party.

More particularly, according to such a service, where a calling party places a collect telephone call to a destination number associated with a called party, and the called party is not then available to receive the collect call, the calling party may be offered the option of recording a message for the called party. According to collect messaging services, such a recorded message is delivered to the called party at a later time. Just as the called party would have been required to accept a charge to receive the collect call had the called party been available at the time the call was placed, with collect messaging, the called party must also accept a charge to receive the message.

However, a destination number may have restricted access for collect calls. That is, such a number or line may be designated as "collect restricted," such that collect calls to that number or line are blocked. As a result, a caller or calling party cannot complete a collect call to such "collect restricted" lines or numbers. "Collect restricted" numbers or lines may include, but are not necessarily limited to, business or residential lines where a "collect calls blocked" option has been selected and all mobile telephone lines or numbers.

For such "collect restricted" lines, when a caller or calling party attempts to place a collect call to such a number, the call is blocked. The calling party's experience may be summarized as follows:

1. A caller places a collect call to a destination number.
2. The destination number has blocked collect calls (which may be the result of a request for collect call blocking by the business or residential customer associated with that destination number or line, or the fact that the destination number is a mobile number or line).
3. The calling party hears a recorded message that the collect call cannot be completed (for example: "For this call, collect billing is not allowed").
4. Call terminated.

Thus, the collect call is not completed. This is the result regardless of whether the called party was available at the time the collect call was placed. Collect messaging service is not available for the calling party to record a message for later delivery, as the destination number or line does not accept collect calls. That is, collect messaging only offers the ability to record a collect message for later delivery where the destination number or line is "collect eligible." Collect messaging is not supported on collect call restricted destination numbers or lines.

As a result, there exists a need for an improved system and method for providing collect messaging. Such a system and method would provide for automatic collect messaging for a calling party placing a collect call to a called party where a destination number associated with the called party has restricted access for collect telephone calls. Such a system and method would provide for recording a message from the calling party for later delivery to the called party. If the called party accepts a charge, the message would be delivered.

SUMMARY OF THE INVENTION

Accordingly, the present invention provides a system and method for providing automatic collect messaging for a calling party placing a collect call to a called party where a destination number associated with the called party has restricted access for collect telephone calls.

According to the present invention, then, in a telephone network for use in placing telephone calls to a destination number associated with a called party, the destination number having restricted access for collect telephone calls, a system is disclosed for providing a message to the called party for a collect telephone call from a calling party. The system comprises a messaging platform for use in recording a message from the calling party and a controller in communication with the messaging platform. The controller is for use in notifying the calling party of the restricted access of the destination number for collect telephone calls, providing the calling party with an option for recording a message for the called party, and, if the calling party accepts the option for recording a message, routing the collect telephone call to the messaging platform.

Also according to the present invention, in a telephone network for use in placing telephone calls to a destination number associated with a called party, the destination number having restricted access for collect telephone calls, a method is disclosed for providing a message to the called party of a collect telephone call from a calling party. The method comprises providing a controller, wherein the controller is for use in notifying the calling party of the restricted access of the destination number for collect telephone calls, providing the calling party with an option for recording a message for the called party, and, if the calling party accepts the option for recording a message, providing for recording the message.

Also according to the present invention, in a telephone network for use in placing telephone calls to a destination number associated with a called party, the destination number having restricted access for collect telephone calls, a method is disclosed for providing a message to the called party of a collect telephone call from a calling party. The method comprises notifying the calling party of the restricted access of the destination number for collect telephone calls and providing the calling party with an option for recording a message for the called party. The method further comprises recording a message for delivery to the called party if the calling party accepts the option for recording a message.

These and other features and advantages of the present invention will be readily apparent upon consideration of the following detailed description of the invention in conjunction with the accompanying drawings.

DETAILED DESCRIPTION OF THE PREFERRED EMBODIMENT(S)

Figure 1:
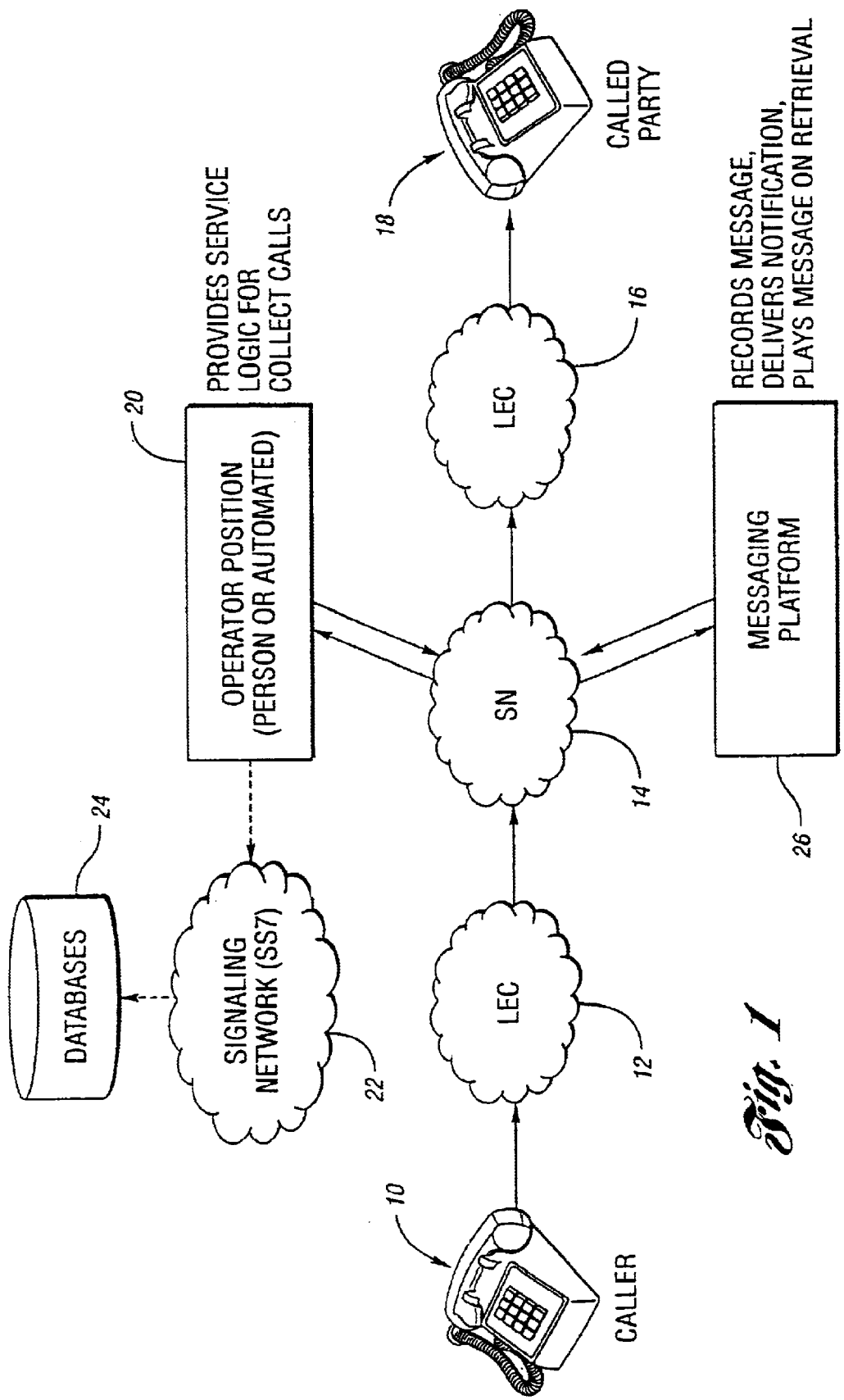
FIG. 1 is a simplified, exemplary block diagram of a system for providing a message to a called party of a collect telephone call according to the present invention.

Referring now to the Figures, the preferred embodiments of the present invention will now be described in detail. Referring first to FIG. 1, a simplified, exemplary block diagram of a system for providing a message to a called party for a collect telephone call according to the present invention is shown. As seen therein, an origination telephone number or line associated with a caller or calling party 10 is provided in communication with a Local Exchange Carrier (LEC) 12, which itself is provided in communication with a Switched Network (SN) 14. SN 14 is also provided in communication with another LEC 16, which is provided in communication with a destination telephone number or line associated with a called party 18.

SN 14 is still further provided in communication with an operator position 20, which is preferably automated, but may alternatively be a person. Operator position 20 provides service logic for a collect call that may be placed by calling party 10 to called party 18. In that regard, operator position 20 is provided in communication with a signaling network (preferably SS7) 22, which itself is provided in communication with databases 24.

To facilitate the improved collect messaging of the present invention, SN 14 is also provided in communication with a messaging platform 26. As will be described in greater detail below, messaging platform 26 is provided for recording collect messages from calling party 10, delivering notification of such messages to the called party 18, and playing such messages upon selection and retrieval thereof by the called party 18.

It should be noted that LEC's 12, 16, SN 14, operator position 20, signaling network 22, databases 24, and messaging platform 26 may take any form known in the art. It should also be noted that all or any portion of those components may be referred to as a telephone network.

According to the present invention, the calling party 10 placing a collect call to the called party 18 having a collect call restricted access destination number is offered the option to record a message for delivery to the called party 18, which message may be referred to as a "collect message." More specifically, the caller 10 is presented with an option to record a collect message. Once the message is recorded, a notification is sent to the called party 18 using the capabilities of currently available collect messaging services.

The called party 18 is informed of the message and is presented with an option to retrieve the collect message. However, unlike conventional collect message services which bill the collect call to the line number of the called party 18, according to the present invention, where the destination line has restricted access for collect calls, the called party 18 is required to pay a fee, preferably by using a commercial credit card, to retrieve the collect message.

More particularly, then, the following represents an illustrative example of the experience of a calling party 10 placing a collect call to a called party 18 according to the present invention, where the destination number associated with the called party 18 has restricted access for collect calls.

1. A caller 10 places a collect call to a destination number.
2. The destination number has blocked collect call (which may be the result of a request for collect call blocking by the business or residential customer associated with that destination number or line or the fact that the destination number is a mobile number or line).
3. The caller 10 hears a recorded message that the collect call cannot be completed, and the caller 10 is presented with an option to record a collect message (for example: "The collect call cannot be completed to this dialed number. However, if you would like to leave a collect message at absolutely no charge to you, press 1").
4. If the caller 10 accepts the collect message option by pressing 1, the collect call is transferred to the messaging platform 26. Otherwise, if the caller 10 declines the option, the collect call is terminated.

As noted, in the event the caller 10 selects the collect message option, the collect call is transferred to the messaging platform 26. In that regard, the following represents an illustrative example of the experience of the caller 10 on the messaging platform 26.

1. The messaging platform 26 instructs the caller 10 to record a message using existing capabilities.
2. The caller records his/her name followed by a collect message.
3. End of call.

Thereafter, the present invention provides for notifying the called party 18 of the collect message and retrieval of such a collect message by the called party 18. In that regard, the following represents an illustrative example of such collect message notification and retrieval.

1. The messaging platform 26 places a call to the original destination number of the called party 18 to notify the called party 18 of the existence of a collect message. To do so, the messaging platform 26 uses the capabilities of existing collect messaging services.
2. Given the billing restrictions on the destination line, the called party 18 is required to pay a fee to retrieve the message, preferably using a commercial credit card, although other payment options could be provided for and supported.

Thus, the present invention provides, for use in a telephone network, the network for use in placing telephone calls to a destination number associated with a called party 18, the destination number having restricted access for collect telephone calls, a system for providing a message to the called party 18 for a collect telephone call from a calling party 10. The system comprises a messaging platform 26 for use in recording a message from the calling party 10, and a controller in communication with the messaging platform 26. In that regard, such a controller may take any form known in the art, such as a programmable router or switch, and is preferably provided at operator position 20. The controller is for use in notifying the calling party 10 of the restricted access of the destination number for collect telephone calls, providing the calling party 10 with an option for recording a message for delivery to the called party 18, and, if the calling party 10 accepts the option for recording a message, routing the collect telephone call to the messaging platform 26.

As previously described, if the calling party 10 declines the option for recording a message, the controller is further for use in terminating the collect telephone call. As also previously described, if the calling party 10 accepts the option, the messaging platform 26 prompts the calling party 10 to record a message, and automatically places a telephone call to the destination number of the called party 18 to attempt to deliver the message. In that regard, to deliver the message, the messaging platform 26 may be for use in delivering a notification message for later receipt by the called party 18, the notification message for use in notifying the called party 18 of the availability of the message from the calling party 10 for retrieval by the called party 18. The called party 18 can retrieve the message either during the notification or by placing another call to retrieve the message.

In that same regard, to deliver the message, the messaging platform 26 provides the called party 18 with an option for retrieving the message for a fee. If the called party 18 accepts the option for retrieving the message, the fee is preferably charged to an account selected by the called party 18, such as a commercial credit card account, although the fee could alternatively be automatically charged to an account associated with the destination number. Still further, if the called party 18 declines the option for retrieving the message, the messaging platform 26 is further for use in terminating the call.

Figure 2:
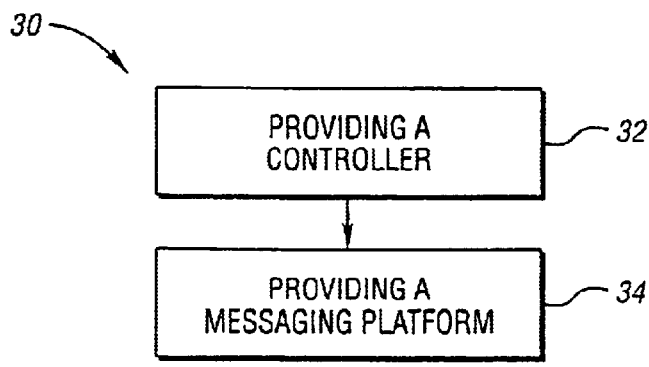
FIG. 2 is a simplified, exemplary flowchart depicting one embodiment of a method for providing a message to a called party of a collect telephone call according to the method of the present invention.

Referring next to FIG. 2, a simplified, exemplary flowchart for one embodiment of a method for providing a message to a called party of a collect telephone call according to the method of the present invention is shown, denoted generally by reference numeral 30. The method 30 is for use in a telephone network, the network for use in placing telephone calls to a destination number associated with a called party, the destination number having restricted access for collect telephone calls. As seen in FIG. 2, and with continuing reference to FIG. 1, the method 30 comprises providing 32 a controller, the controller for use in notifying the calling party 10 of the restricted access of the destination number for collect telephone calls, providing the calling party 10 with an option for recording a message for delivery to the called party 18, and, if the calling party 18 accepts the option for recording a message, providing for recording the message.

In that regard, as previously described, such a controller may take any form known in the art, such as a programmable router or switch, and is preferably provided at operator position 20. The method 30 may further comprise providing 34 a messaging platform 26 for use in recording a message from the calling party 10, wherein the controller routes the collect telephone call to the messaging platform 26 if the calling party 10 accepts the option for recording a message.

As described in greater detail above, according to the method 30 of the present invention, if the calling party 10 declines the option for recording a message, the controller is further for use in terminating the collect telephone call. As also previously described, the messaging platform 26 prompts the calling party 10 to record a message, and automatically places a telephone call to the destination number of the called party 18 to attempt to deliver the message.

To deliver the message, the messaging platform 26 provides the called party 18 with an option for retrieving the message for a fee. If the called party 18 accepts the option for retrieving the message, the fee is preferably charged to an account selected by the called party 18 such as a commercial credit card account although, alternatively, the fee could be automatically charged to another account associated with the destination number. If the called party 18 declines the option for retrieving the message, the messaging platform 26 is further for use in terminating the telephone call.

Figure 3:
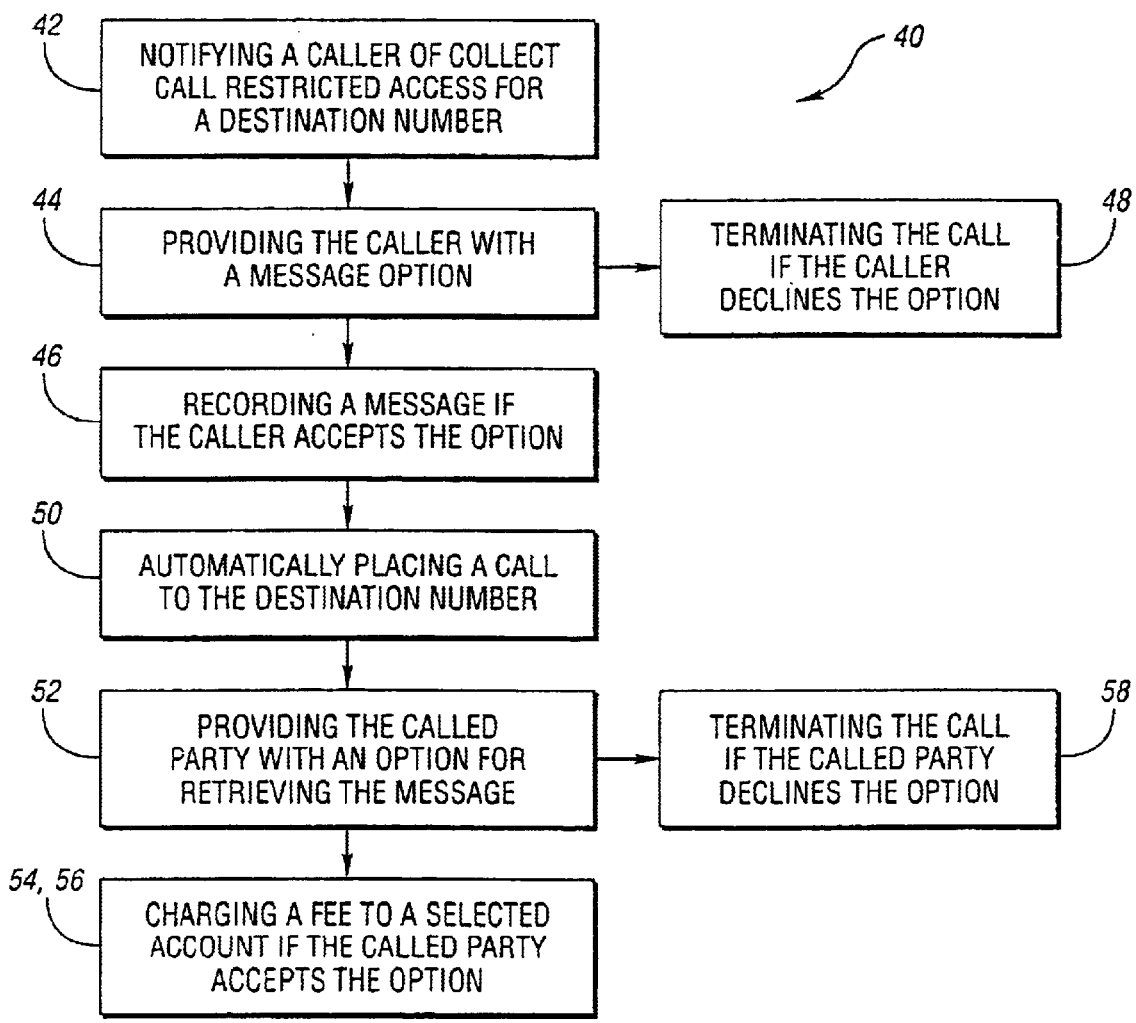
FIG. 3 is a simplified, exemplary flowchart depicting another embodiment of a method for providing a message to a called party of a collect telephone call according to the method of the present invention.

Referring next to FIG. 3, a simplified, exemplary flowchart for another embodiment of a method for providing a message to a called party of a collect telephone call according to the method of the present invention is shown, denoted generally by reference numeral 40. The method 40 is for use in a telephone network, the network for use in placing telephone calls to a destination number associated with a called party, the destination number having restricted access for collect telephone calls. As seen in FIG. 3, and again with continuing reference to FIG. 1, the method 40 comprises notifying 42 the calling party 10 of the restricted access of the destination number for collect telephone calls, providing 44 the calling party 10 with an option for recording a message for the called party 18, and recording 46 a message for delivery to the called party 18 if the calling party 18 accepts the option for recording a message. In that regard, as described in detail above in connection with FIG. 1, recording 46 the message may comprise routing the collect telephone call to a messaging platform 26.

The method 40 may further comprise terminating 48 the collect telephone call if the calling party 10 declines the option for recording a message. The method 40 may still further comprise automatically placing 50 a telephone call to the destination number to deliver the message.

To deliver the message, the method 40 of the present invention may also comprise providing 52 the called party 18 with an option for retrieving the message for a fee. In that regard, the method 40 may further comprise automatically charging 54 the fee to an account associated with the destination number if the called party 18 accepts the option for retrieving the message, or charging 56 the fee to an account selected by the called party 18 if the called party 18 accepts the option for retrieving the message. The method may also comprise terminating 58 the telephone call if the called party 18 declines the option for retrieving the message.

It should be noted that the simplified flowcharts depicted in FIGS. 2 and 3 are exemplary of the method of the present invention. In that regard, the method may be executed in sequences other than those shown in FIGS. 2 and 3, including the execution of a subset of the steps shown and/or the execution of one or more steps simultaneously.

As is readily apparent from the foregoing description, the system and method of the present invention thus provide a consistent and reliable means to successfully deliver collect messages to telephone numbers or lines where collect calls cannot be completed. The system and method of the present invention still further provide a general capability that is usable in connection with other services which are blocked or denied due to billing restrictions when using a conventional billing mechanism.

From the foregoing description, it can be seen that the present invention provides an improved system and method for providing collect messaging. The system and method automatically provide a message from a calling party placing a collect call to a called party where a destination number associated with the called party has restricted access for collect telephone calls. The system and method also provide for recording a message from the calling party for later delivery to the called party. If the called party accepts a charge, the message would be delivered.

While various embodiments of the invention have been illustrated and described, it is not intended that these embodiments illustrate and describe all possible forms of the present invention. Rather, the words used in the specification are words of description rather than limitation, and it is understood that various changes may be made without departing from the spirit and scope of the invention. Indeed, many alternatives, modifications, and variations will be apparent to those skilled in the art in light of the foregoing description, and the present invention is intended to embrace all such alternatives.

What is claimed:

1. In a telephone network for use in placing telephone calls to a destination number associated with a called party, the destination number having restricted access for collect telephone calls, a system for providing a message to the called party of a collect telephone call from a calling party, the system comprising:

a messaging platform for use in recording a message from the calling party; and a controller in communication with the messaging platform, the controller for use in notifying the calling party of the restricted access of the destination number for collect telephone calls, such that collect calls to the destination number are blocked, providing the calling party with an option for recording a message for delivery to the called party, and, if the calling party accepts the option for recording a message, routing the collect telephone call to the messaging platform.

2. The system of claim 1 wherein, if the calling party declines the option for recording a message, the controller is further for use in terminating the collect telephone call.

3. The system of claim 1 wherein the messaging platform prompts the calling party to record a message.

4. The system of claim 3 wherein the messaging platform automatically places a telephone call to the destination number to deliver the message.

5. The system of claim 4 wherein, to deliver the message, the messaging platform is for use in delivering a notification message for receipt by the called party, the notification message for use in notifying the called party of the availability of the message from the calling party for retrieval by the called party.

6. The system of claim 4 wherein, to deliver the message, the messaging platform provides the called party with an option for retrieving the message for a fee.

7. The system of claim 6 wherein, if the called party accepts the option for retrieving the message, the fee is automatically charged to an account associated with the destination number.

8. The system of claim 6 wherein, if the called party accepts the option for retrieving the message, the fee is charged to an account selected by the called party.

9. The system of claim 6 wherein, if the called party declines the option for retrieving the message, the messaging platform is further for use in terminating the telephone call.

10. In a telephone network for use in placing telephone calls to a destination number associated with a called party, the destination number having restricted access for collect telephone calls, a method for providing a message to the called party of a collect telephone call from a calling party, the method comprising:

notifying the calling party of the restricted access of the destination number for collect telephone calls; such that collect calls to the destination number are blocked, providing the calling party with an option for recording a message for the called party; and recording a message for delivery to the called party if the calling party accepts the option for recording a message.

11. The method of claim 10 wherein recording the message comprises routing the collect telephone call to a messaging platform.

12. The method of claim 10 further comprising terminating the collect telephone call if the calling party declines the option for recording a message.

13. The method of claim 10 further comprising automatically placing a telephone call to the destination number to deliver the message.

14. The method of claim 13 further comprising, to deliver the message, providing the called party with an option for retrieving the message for a fee.

15. The method of claim 14 further comprising automatically charging the fee to an account associated with the destination number if the called party accepts the option for retrieving the message.

16. The method of claim 14 further comprising charging the fee to an account selected by the called party if the called party accepts the option for retrieving the message.

17. The method of claim 14 further comprising terminating the telephone call if the called party declines the option for retrieving the message.

* * * * *